United States Patent
Lee et al.

(10) Patent No.: US 12,220,653 B2
(45) Date of Patent: Feb. 11, 2025

(54) MESH FILTER FOR FUEL SUPPLY SYSTEM OF VEHICLE

(71) Applicants: HYUNDAI MOTOR COMPANY, Seoul (KR); KIA CORPORATION, Seoul (KR)

(72) Inventors: Hyun No Lee, Cheonan-si (KR); Dong Lim Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/126,569

(22) Filed: Mar. 27, 2023

(65) Prior Publication Data

US 2023/0226467 A1 Jul. 20, 2023

Related U.S. Application Data

(62) Division of application No. 16/678,611, filed on Nov. 8, 2019, now abandoned.

(30) Foreign Application Priority Data

Jul. 24, 2019 (KR) .................. 10-2019-0089516

(51) Int. Cl.
| | | |
|---|---|---|
| *B01D 24/00* | (2006.01) | |
| *B01D 35/30* | (2006.01) | |
| *B01D 43/00* | (2006.01) | |
| *B60K 15/03* | (2006.01) | |

(52) U.S. Cl.
CPC ........... *B01D 24/004* (2013.01); *B01D 35/30* (2013.01); *B01D 43/00* (2013.01); *B60K 15/03* (2013.01); *B60K 2015/03236* (2013.01)

(58) Field of Classification Search
CPC .. B01D 35/147; B01D 35/027; B01D 27/103; B01D 2201/16; F02M 37/0035; F02M 37/48; F02M 37/36; F02M 37/50; B60K 15/03236

See application file for complete search history.

(56) References Cited

U.S. PATENT DOCUMENTS

| | | | |
|---|---|---|---|
| 3,291,391 | A | 12/1966 | Bernard |
| 4,126,553 | A | 11/1978 | Berg |
| 4,783,271 | A | 11/1988 | Silverwater |
| 2013/0061960 | A1 | 3/2013 | Jeon et al. |
| 2014/0069874 | A1 | 3/2014 | Hubbard |

FOREIGN PATENT DOCUMENTS

| | | |
|---|---|---|
| EP | 3029324 A1 | 6/2016 |
| GB | 2555598 A | 5/2018 |
| JP | 2007018758 A | 1/2007 |

(Continued)

*Primary Examiner* — Benjamin M Kurtz
(74) *Attorney, Agent, or Firm* — Lempia Summerfield Katz LLC (57) ABSTRACT

A mesh filter for a fuel system of a vehicle may include: a frame for maintaining a shape thereof; a mesh member coupled to the frame so as to remove foreign substances contained in fuel, where the mesh member includes a first mesh member and a second mesh member; and an opening unit for opening and closing a fuel path in the first mesh member. In particular, the second mesh member has a mesh size smaller than a mesh size of the first mesh member such that the mesh filter inhibits clogging of the mesh filter with paraffin wax.

8 Claims, 8 Drawing Sheets

(56) References Cited

FOREIGN PATENT DOCUMENTS

| | | | |
|---|---|---|---|
| JP | 2012241098 | A | 12/2012 |
| JP | 5896129 | B2 | 3/2016 |
| KR | 20040000851 | A | 1/2004 |
| KR | 20120019804 | A | 3/2012 |
| KR | 101776430 | B1 | 9/2017 |

MESH FILTER FOR FUEL SUPPLY SYSTEM OF VEHICLE

CROSS-REFERENCE TO RELATED APPLICATIONS

This application is a divisional application of non-provisional U.S. patent application Ser. No. 16/678,611, filed on Nov. 8, 2019, which claims priority to and the benefit of Korean Patent Application No. 10-2019-0089516, filed on Jul. 24, 2019, the entire contents of each of which are incorporated herein by reference.

FIELD

The present disclosure relates to a mesh filter for a fuel system of a vehicle.

BACKGROUND

The statements in this section merely provide background information related to the present disclosure and may not constitute prior art.

Figure 1:
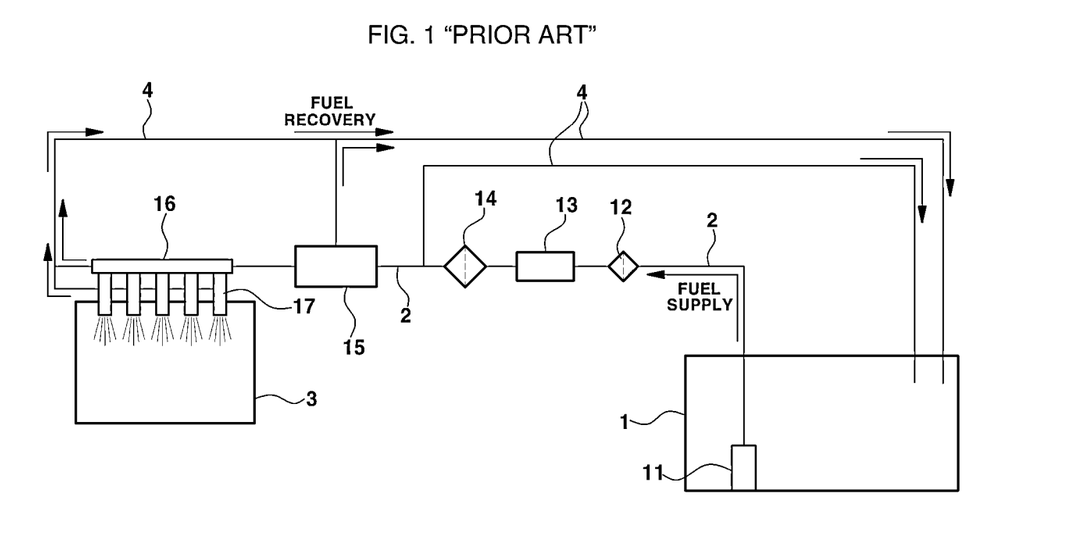
FIG. 1 is a view illustrating a fuel system of a diesel vehicle.

FIG. 1 is a view illustrating a fuel system of a diesel vehicle, which includes a fuel tank 1, a fuel supply line 2, an engine 3, a fuel recovery line 4, a mesh filter 11, a prefilter 12, a low-pressure fuel pump 13, a main filter 14, a high-pressure fuel pump 14, a common rail 16 and an injector 17.

In a general fuel system of a diesel vehicle, fuel, which is introduced by the low-pressure fuel pump 13, is filtered while passing through the mesh filter 11 provided in the fuel tank 1, and the prefilter 12 provided in the fuel supply line 2. Subsequently, the fuel is pumped by means of the low-pressure fuel pump 13, and is further filtered so as to remove foreign substances contained in the fuel while passing through the main filter 14.

Thereafter, the fuel that has passed through the main filter 14 is supplied to the common rail 16 under high pressure by means of the high-pressure fuel pump 15 and is sprayed to the cylinder of the engine 3 through the injector 17.

The prefilter 12 serves to heat diesel fuel, and a PTC heater (not shown) provided in the prefilter 12 is activated so as to heat the diesel fuel, thereby removing solidified paraffin created in the fuel.

The high-pressure fuel pump 15 utilizes a portion of the diesel fuel that has passed through the main filter 14 for cooling and lubrication.

A portion of the fuel that has been supplied to the common rail 16 along the fuel supply line 2 remains therein without being sprayed through the injector 17. The remaining fuel is recovered to the fuel tank 1 from the injector 17 and the common rail 16 through the fuel recovery line 4.

Furthermore, the diesel fuel, which is used in cooling and lubrication, is also recovered to the fuel tank 1 through the fuel recovery line 4, and a portion of the diesel fuel that has been filtered through the main filter 14 is also recovered to the fuel tank 1 through an additional fuel recovery line 4.

The prefilter 12 of the fuel system of a diesel vehicle includes a water separator for separating water from the fuel. In a general commercial diesel vehicle, the mesh filter 11 is provided inside the fuel tank 1, and the prefilter 12 is provided outside the fuel tank 1.

Because diesel fuel has a high boiling temperature during distillation, the diesel fuel contains a large amount of a paraffin component therein. Because the paraffin component has excellent ignition performance and high calorific value, the paraffin component must necessarily be contained in diesel fuel.

However, the paraffin solidifies at a low temperature even though the paraffin has a liquid form at an ambient temperature. Particularly, when the amount of paraffin wax, which solidifies in winter season, is increased, the viscosity of the fuel is increased.

Fuel containing a large amount of paraffin wax is difficult to pass through a filter element in each filter. When the filter is clogged due to the paraffin wax, flowability of the fuel is lowered, and the supply of fuel becomes unstable.

Hence, startup performance of an engine is deteriorated in winter season, and the supply of fuel becomes unstable during travelling, thereby causing shutdown of the engine. Furthermore, there may be various problems of excessive generation of soot, insufficient output during travelling of a vehicle, deterioration of acceleration performance and the like.

By way of example, when a vehicle moves to a cold area in winter season, the fuel may solidify. In this case, when the vehicle travels under acceleration immediately after soaking of the vehicle, a problem may be caused in the fuel system of the vehicle due to the solidified fuel.

In the case of a prefilter, in order to solve a problem in which the filter element in the prefilter is clogged due to paraffin wax, a heating unit is provided to melt the paraffin wax By way of example, the prefilter is provided thereabove with a PTC heater and thereunder with a heating coil as a heating unit. Consequently, the heating unit is selectively activated through a temperature-sensitive switch by the supply of power depending on temperature.

In the case of a mesh filter in a fuel tank, we have found that particles of paraffin wax, which are formed at low temperatures, have a rhombic plate shape of about 200 µm, and the paraffin wax is caught in a filter having a mesh size of 130 µm, thereby causing clogging of the filter.

Although clogging of the filter occurs at a low temperature, there is no solution for solving the problem of clogging of a mesh filter.

The above information disclosed in this Background section is only for enhancement of understanding of the background of the present disclosure and therefore it may contain information that does not form the prior art that is already known to a person of ordinary skill in the art.

SUMMARY

The present disclosure provides a mesh filter for a fuel system of a vehicle capable of inhibiting problems caused by clogging of the mesh filter provided in a fuel tank due to paraffin wax.

Particularly, the present disclosure solves problems of clogging of a filter due to paraffin wax, introduction of air into an introduction pipe and generation of air bubbles in the path for fuel supply, and various problems caused thereby while normally removing foreign substances contained in fuel.

The objects of the present disclosure are not limited to the above-mentioned objects. Other specific details of the present disclosure will be apparent from the following detailed description and the forms of the present disclosure.

In one aspect of the present disclosure, a mesh filter for a fuel system of a vehicle may include: a frame for maintaining a shape thereof; a mesh member coupled to the frame and configured to remove foreign substances contained in fuel, where the mesh member includes a first mesh member, and a second mesh member; and an opening unit for opening and closing a fuel path in the first mesh member. In particular, the second mesh member has a mesh size smaller than a mesh size of the first mesh member.

The above and other features of the present disclosure are discussed infra.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, forms of the present disclosure will be described in detail with reference to the accompanying drawings so as to be easily realized by a person having ordinary skill in the art to which the present disclosure pertains.

Throughout the description of the forms, when a phrase stating that a part "includes" an element is used, it will be understood that the part does not exclude the presence of other elements but may further include one or more other elements unless stated otherwise.

Figure 2:
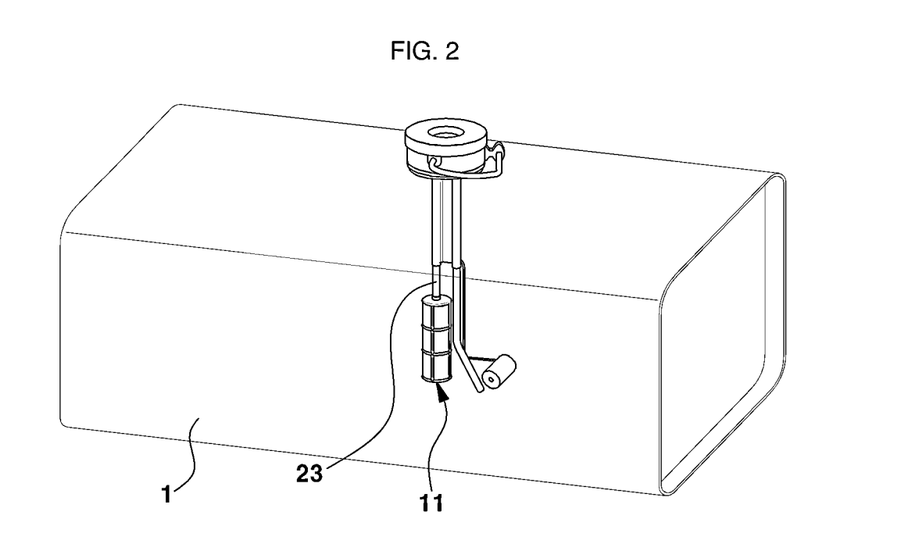
FIG. 2 is a view illustrating a mesh filter for a fuel system of a vehicle according to one form of the present disclosure, which is provided in a fuel tank.

FIG. 2 is a view illustrating a mesh filter for a fuel system of a vehicle according to one form of the present disclosure, which is provided in a fuel tank.

Figure 3:
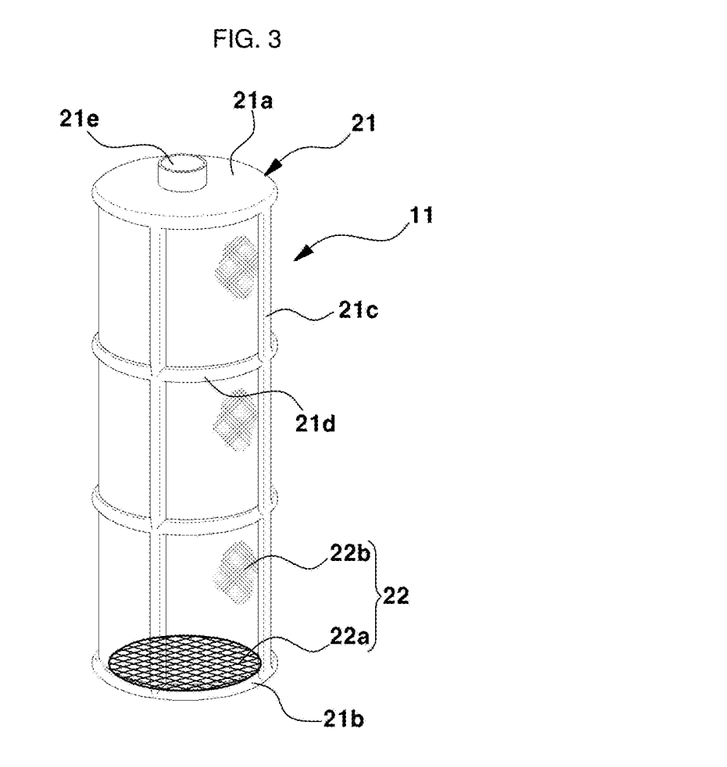
FIG. 3 is a perspective view illustrating the mesh filter according to one form of the present disclosure.
Figure 4:
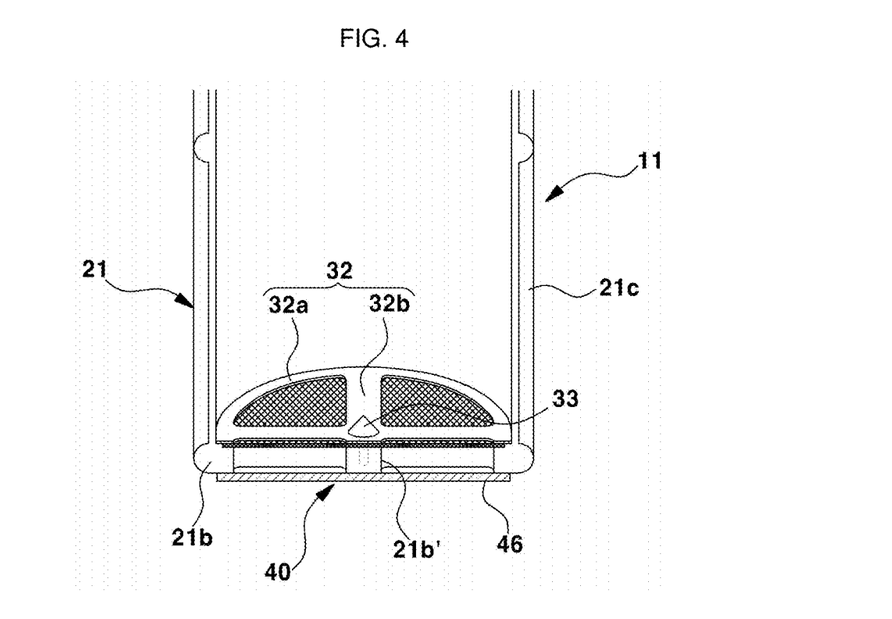
FIG. 4 is a perspective view illustrating the substantial portions of the mesh filter according to one form of the present disclosure in a cutaway view.

FIG. 3 is a perspective view illustrating the mesh filter according to one form of the present disclosure. FIG. 4 is a perspective view illustrating the substantial portions of the mesh filter according to one form of the present disclosure in a cutaway view.

In FIGS. 3 and 4, the illustration of an introduction pipe 23 (see FIG. 2), which is inserted into the mesh filter 11, is omitted.

In a fuel system of a diesel vehicle, the mesh filter 11, which is disposed in the fuel tank 1, includes a frame 21 for maintaining the shape thereof and a mesh member 22 supported by the frame 21.

Here, the mesh member 22 is a filter member for removing foreign substances contained in fuel, which flows therethrough, and all of the frame 21 and the mesh member 22 of the mesh filter 11 may be made of a plastic material.

In the case of the mesh filter 11 made of a plastic material, because there is a concern about low heat resistance and the occurrence of thermal deformation, it is impossible to apply a heating device such as a PTC heater and a heating coil for preventing clogging of the filter with paraffin wax.

In addition, when the mesh size of the mesh filter 11 is increased in order to prevent the clogging of the filter, the amount of foreign substances transferred to a prefilter 12 (see FIG. 1) from inside the fuel tank 1 may be increased, and thus the replacement cycle of the prefilter may be shortened.

Furthermore, if clogging of the mesh filter with paraffin wax occurs when a portion of the mesh filter 11 is exposed to air over the fuel lever in the fuel tank 1 because the fuel level in the fuel tank 1 is low, the fuel level in the mesh filter 11 may also be lowered and the fuel level in the mesh filter 11 may be lowered below the lower end inlet of the introduction pipe 23 because fuel cannot be introduced into the mesh filter 11.

At this time, when air is introduced into the mesh filter through the exposed portion of the mesh filter that is positioned above the fuel level in the fuel tank 1, a large amount of air may be introduced into an air supply line 2 (see FIG. 1), which is connected to the prefilter, through the introduction pipe 23.

As a result, because a large number of air bubbles are present in the fuel supply line 2 (see FIG. 1) between the fuel tank 1 and the prefilter 12 (see FIG. 1), there are many problems, including unstable fuel supply, deteriorated start-up performance of an engine and decreased fuel injection pressure of an injector.

Hence, an attempt to apply a mesh member having a relatively large mesh size only to at least a portion of the mesh filter 11 and to apply a mesh member having a normal mesh size to the remaining portion of the mesh filter 11 may be considered.

Specifically, a first mesh member 22a having a relatively large mesh size is applied to a first region, which is at least a portion of the entire region of the mesh member 22 of the mesh filter 11, and a second mesh member 22b having a smaller mesh size than the mesh size of the first mesh member 22a is applied to a second region, which is the remaining region of the entire region of the mesh member 22 of the mesh filter 11.

In this case, since an air bubble is generated in the fuel supply line 2 between the fuel tank 1 and the prefilter 12, it is possible to provide stable fuel supply.

However, a large amount of foreign substances may pass through the first mesh member 22a having a larger mesh size, and the foreign substances may be transferred to the prefilter 12 and may contaminate the filter element in the prefilter early, thereby shortening the replacement cycle of the prefilter.

Accordingly, it is desired to allow fuel to selectively pass through the first mesh member 22a only at a low temperature at which clogging of filter with paraffin wax may occur.

To this end, the mesh filter 11 according to one form of the present disclosure is provided with an opening unit for selectively opening and closing the fuel path, which extends through the first mesh member 22a, depending on the temperature of the fuel.

Hereinafter, the mesh filter 11 according to one form of the present disclosure will be described in more detail with reference to the accompanying drawings.

As illustrated in FIG. 2, the mesh filter 11 is disposed inside the fuel tank 1 such that the lower end of the mesh filter 11 is upwardly spaced apart from the internal bottom surface of the fuel tank 1 by a predetermined distance.

The introduction pipe 23 is inserted into the mesh filter 11 so as to be vertically disposed in the mesh filter 11. The lower end inlet of the introduction pipe 23, which is disposed in the mesh filter 11, is spaced apart from the internal bottom surface of the mesh filter by a predetermined height such that the fuel in the mesh filter 11 is introduced into the lower end inlet of the introduction pipe 23.

The introduction pipe 23 is disposed in the fuel tank 1 and is disposed between the mesh filter 11 and the fuel supply line 2 (see FIG. 1) so as to be connected thereto, and the introduction pipe 23 in the fuel tank 1 and the fuel supply line 2 outside the fuel tank 1 serve as a fuel supply path through which fuel is supplied to the prefilter 12 (see FIG. 1) from the mesh filter 11.

As illustrated in FIGS. 2 and 3, the mesh filter 11 according to the form of the present disclosure may have a cylindrical shape, and may be constructed such that the frame 21 and the mesh member 22 are integrally coupled to each other.

The frame 21 includes a plate part 21a, which is positioned at the upper end thereof, a ring part 21b, which is positioned at the lower end thereof, a plurality of posts 21c, which extend between the plate part 21a and the ring part 21b so as to connect the same to each other, and a plurality of connecting parts 21d, which circumferentially extend so as to connect the plurality of posts 21c to each other.

In this mesh filter 11, the plurality of posts 21c are disposed at predetermined intervals in a circumferential direction, and the plurality of connecting parts 21d are disposed at predetermined intervals in a vertical direction.

Consequently, the frame 21 is configured such that the posts 21c, which vertically extend, intersect the connecting parts 21d each having a circular shape.

The plate part 21a is provided with an insert hole 21e, through which the introduction pipe 23 is inserted into the mesh filter 11.

Accordingly, the spaces defined between the posts 21c and the connecting parts 21d and the space in the ring part 21b serve as the spaces through which the fuel in the fuel tank 1 is introduced into the mesh filter 11.

The mesh member 22 of the mesh filter 11, which is a filter element for removing foreign substances from the fuel that is introduced through the mesh filter 11 and the introduction pipe 23, may be positioned in the spaces defined between the posts 21c and the connecting parts 21d, which constitute the side face of the mesh filter, and in the space in the ring part 21b, which constitutes the bottom face of the filter.

According to one form of the present disclosure, the frame 21 and the mesh member 22 may be made of a plastic material. For example, the frame 21 may be made of polypropylene (PP) resin, and the mesh member 22 may be made of polyamide (PA) resin.

According to another form of the present disclosure, the mesh member 22 includes the first mesh member 22a, having a relatively large mesh size, and the second mesh member 22b, having a smaller mesh size than the mesh size of the first mesh member 22a.

As mentioned above, the first mesh member 22a is disposed at at least a portion of the mesh filter 11, and the second mesh member 22b is disposed at the remaining portion of the mesh filter 11.

Specifically, the first mesh member 22a is disposed at at least a portion of the entire region of the mesh member 22, and the second mesh member 22b is disposed at the remainder of the entire region of the mesh member 22.

According to one form of the present disclosure, the first mesh member 22a may be constituted by a mesh member having a larger mesh size than the mesh size of particles of typical paraffin wax.

Specifically, considering that a size of particles of typical paraffin wax is around 200 µm, the first mesh member 22a may be constituted by a mesh member having a mesh size larger than approximately 200 µm, for example, a mesh member having a mesh size of around 400 µm.

Here, the mesh size means the distance between longitudinal mesh wires or transverse mesh wires, which intersect each other. Accordingly, an increased mesh size means an increased space between mesh wires through which fuel passes.

The first region of the mesh filter 11, in which the first mesh member 22a is provided, may be a region that allows fuel to pass therethrough even in the state in which the fuel level in the fuel tank 1 is low, for example, a region positioned at the lower end of the mesh filter 11. More specifically, the first region of the mesh filter 11 may be a region corresponding to the bottom surface at the lower end of the mesh filter 11.

Here, the first mesh member 22a may be positioned in the space inside the ring part 21b of the lower end of the mesh filter 11. In this case, the first mesh member 22a may be the portion that constitutes the bottom (lower surface) at the lower end of the mesh filter 11.

Referring to FIG. 3, the first mesh member 22a may be disposed in the ring part 21b of the lower end of the mesh filter 11, and thus fuel may be introduced through the first mesh member 22a at the lower surface of the mesh filter 11.

According to other form of the present disclosure, the second mesh member 22b may have a mesh size smaller than the particle size of paraffin wax, for example, a mesh size of approximately 130 µm.

Furthermore, the second mesh member 22b may be a mesh member, which is the same as a mesh member used in a conventional mesh filter or which has the same mesh size as a mesh size of a conventional mesh filter.

In the mesh filter 11, the second mesh member 22b may be positioned in the spaces defined between the posts 21c and the connecting parts 21d, which constitute the frame 21. Consequently, the second mesh member 22b may be the portion that constitutes the side surface (the peripheral surface of the cylinder) of the mesh filter 11.

In the mesh filter 11 according to the form of the present disclosure, the fuel in the fuel tank 1 may be introduced into the filter through the first mesh member 22a and the second mesh member 22b. Here, because the mesh size of the first mesh member 22a is larger than the particle size of paraffin wax, the paraffin wax may also be introduced into the filter through the first mesh member together with the fuel.

In contrast, because the second mesh member 22b has a mesh size smaller than the particle size of the paraffin wax, the paraffin wax cannot be introduced into the filter through the second mesh member 22b, with the result that foreign substances are filtered by the second mesh member 22b.

In other words, the mesh filter 11 allows paraffin wax, which causes clogging of the filter, to be introduced through the first mesh member 22a of the entire mesh member 22. Since the first mesh member 22a constitutes the lower surface of the mesh filter 11, the mesh filter 11 allows the paraffin wax to be introduced thereinto through the lower surface thereof.

In short, the mesh filter 11 further includes a novel mesh member region or path, which allows the paraffin wax as well as fuel to pass therethrough, in addition to a conventional mesh member region or path, which may make it difficult for both foreign substances and a paraffin wax component to pass therethrough and which may cause clogging of the filter with paraffin wax.

In the form illustrated in the drawings, the side portion of the filter at which the second mesh member 22b is provided may be the conventional path portion through which fuel passes, and the lower surface of the filter at which the first mesh member 22a is provided may be the novel path portion, which is newly provided according to the present disclosure.

In this way, when the mesh filter is constructed so as to allow fuel and paraffin wax to pass through the lower surface thereof, at which the first mesh member 22a is provided, under a low temperature condition in which paraffin wax may solidify in the fuel, clogging of the first mesh member 22a attributable to the paraffin wax is prevented, and the fuel is introduced into the filter through the lower surface portion of the filter. As a result, the inside of the filter is sufficiently filled with the fuel, thereby preventing the inlet of the lower end of the introduction pipe 23 from being exposed to air.

Because a conventional mesh filter is constructed such that the entire mesh member has a mesh size that may prevent paraffin wax from passing through the mesh member and may thus cause clogging of the filter with the paraffin wax, the entire mesh member is clogged by the paraffin wax component, thereby obstructing the introduction of fuel into the filter when the temperature of the fuel in the fuel tank is low.

Hence, when the fuel level in the filter is low, the inlet of the lower end of the introduction pipe may be exposed to air above the fuel level, and air may thus be introduced into the fuel supply line, thereby generating a large amount of air bubbles.

The mesh filter according to the form of the present disclosure is constructed so as to allow a paraffin wax component in fuel to pass through the region of the mesh member region having a relatively small area, that is, the region of the first mesh member 22a, thereby preventing a phenomenon in which the first mesh member 22a is clogged by the paraffin wax. Accordingly, since the fuel level in the filter sufficiently rises even at a low temperature, such as during the winter season, it is possible to prevent a phenomenon in which the inlet of the lower end of the introduction pipe 23 is exposed to air and a phenomenon in which a large amount of air bubbles is generated in the fuel supply path due to air introduced through the inlet of the lower end of the introduction pipe 23.

As mentioned above, the present disclosure is particularly intended to reliably prevent a phenomenon in which the fuel level in the filter is lowered due to clogging of the entire region of the mesh member and air is thus introduced into the introduction pipe 23 and forms air bubbles therein, even though a small amount of a paraffin wax component is inevitably introduced into the mesh filter 11 through the small area of the first mesh member 22a.

FIG. 4 is a cross-sectional view illustrating the mesh filter 11 according to a first form of the present disclosure, to which the first mesh member 22a is provided. Here, the ring part 21b is positioned at the lower end of the frame 21 of the mesh filter 11.

The ring part 21b includes a support portion (not shown), which radially extends from the ring-shaped portion to the center portion 21b'.

Here, the space defined between the ring-shaped portion and a support portion of the ring part 21b serves as a space through which fuel passes, and a support member 32 is placed on the ring part 21b.

The first mesh member 22a is disposed between the ring part 21b and the support member 32, and a fastener 33 is inserted into the center portion 21b' of the ring part 21b, the first mesh member 22a, the support member 32 and a dielectric elastomer actuator 46 of an opening unit to be described later.

Consequently, the first mesh member 22a, the support member 32 and the dielectric elastomer actuator 46 are integrally coupled and secured to one another by the fastener 33. The support member 32 supports the first mesh member 22a in the filter so as to prevent separation of the first mesh member 22a.

The fastener 33 may be integrally formed with a rubber valve 47 (see FIG. 7) of the dielectric elastomer actuator 46. Alternatively, although not illustrated in the drawings, the fastener 33 may be inserted into the center of the rubber valve 47 of the dielectric elastomer actuator 46 and may be coupled thereto.

The support member 32 may be composed of an annular ring portion 32a and a support portion 32b, which is configured to have a crisscross shape and is integrally formed with the ring portion 32a. Fuel may pass through the space defined between the ring portion 32a and the crisscross-shaped support portion 32b.

The support portion 32b of the support member 32 and the support portion (not shown) of the ring portion 21b may be configured to have approximately the same shape.

In one form of the present disclosure, the mesh filter 11 may include an opening unit 40 for opening and closing the fuel path in the first mesh member 22a provided at the lower end of the filter.

Figure 5:
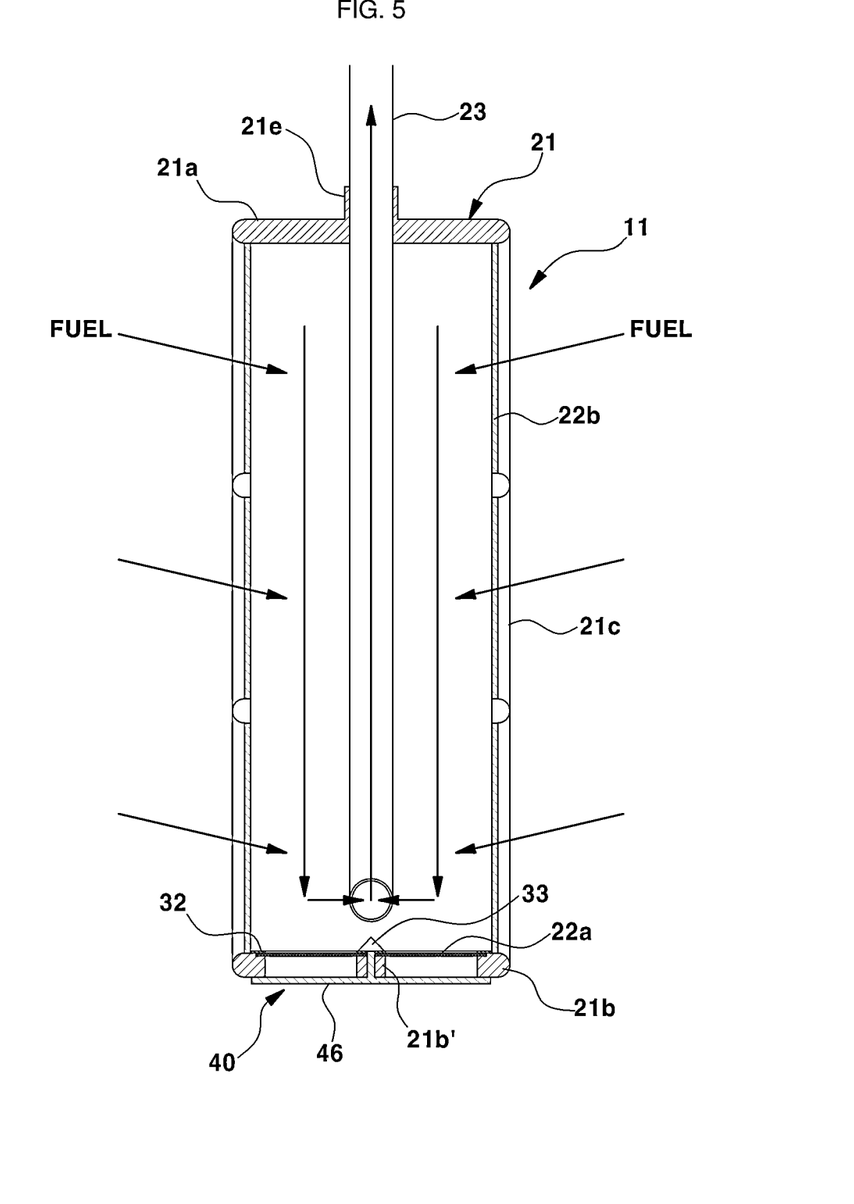
FIG. 5 is a view illustrating the mesh filter according to one form of the present disclosure, in which an opening unit closes a fuel path in a first mesh member.
Figure 6:
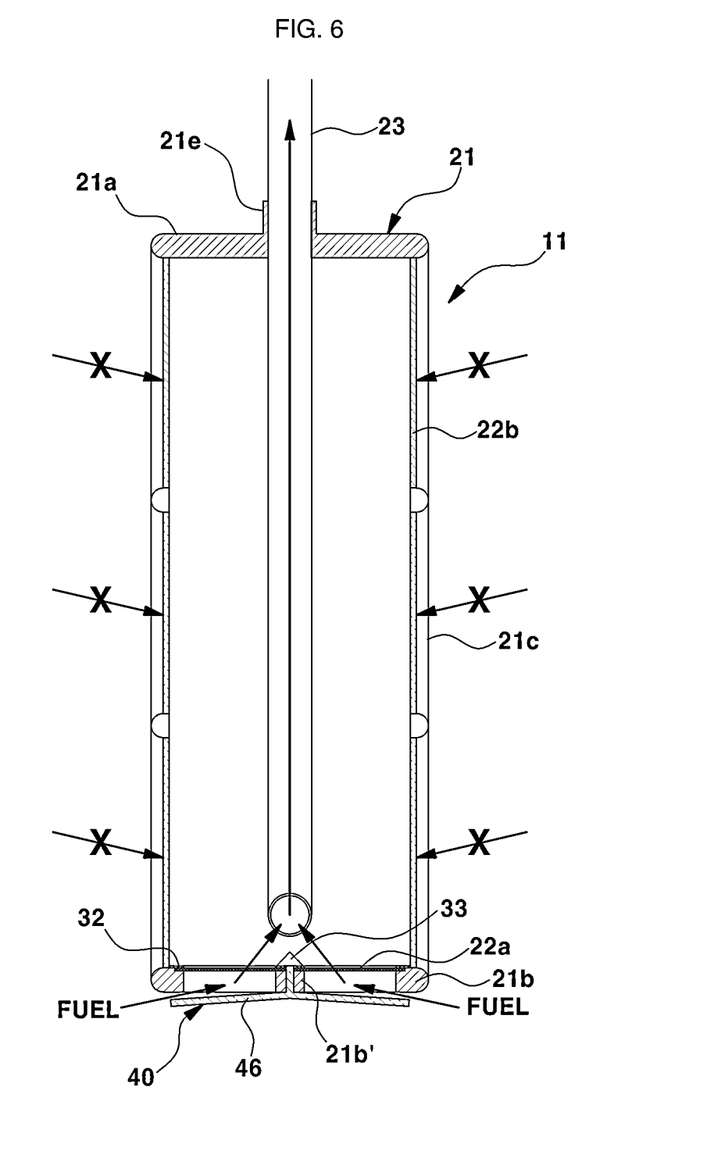
FIG. 6 is a view illustrating the mesh filter according to one form of the present disclosure, in which the opening unit opens the fuel path in the first mesh member.

FIG. 5 is a view illustrating the mesh filter 11 according to one form of the present disclosure, in which the opening unit 40 closes the fuel path in the first mesh member 22a. FIG. 6 is a view illustrating the mesh filter 11 according to another form of the present disclosure, in which the opening unit 40 opens the fuel path in the first mesh member 22a.

Figure 7:
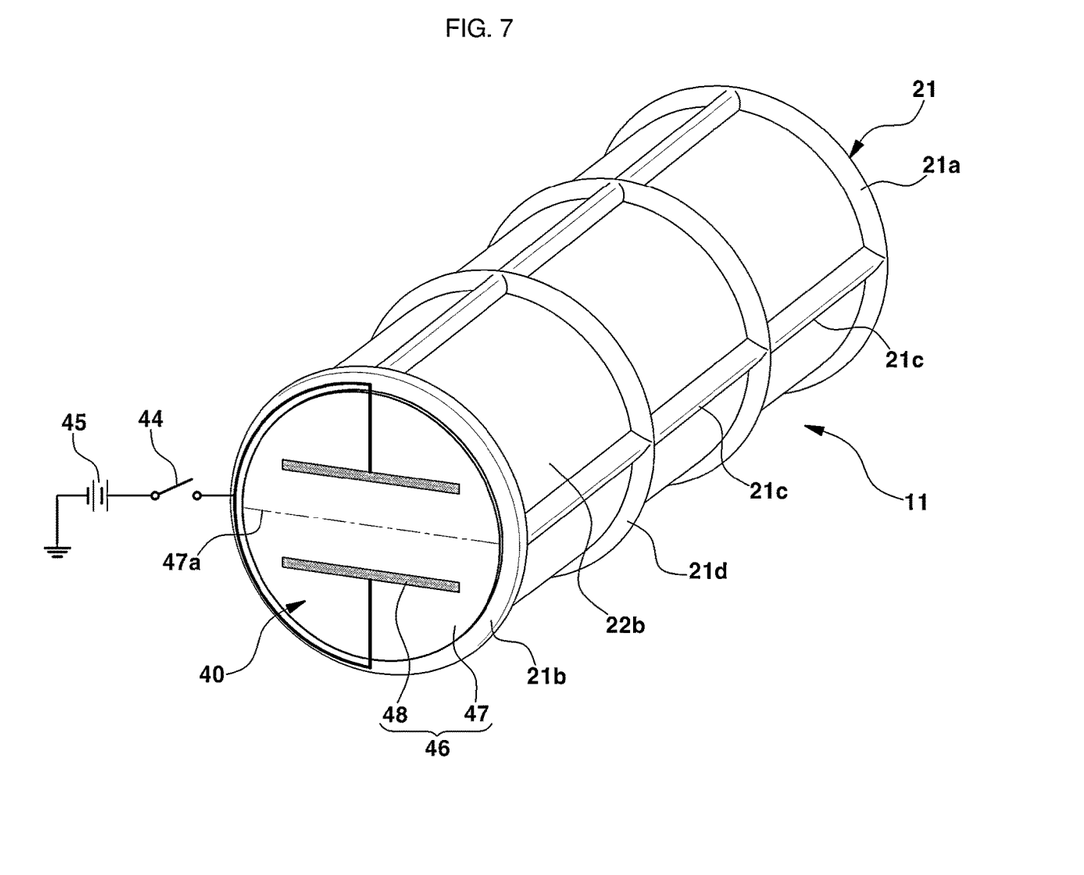
FIG. 7 is a perspective view illustrating the structure of the opening unit of the mesh filter according to one form of the present disclosure.
Figure 8:
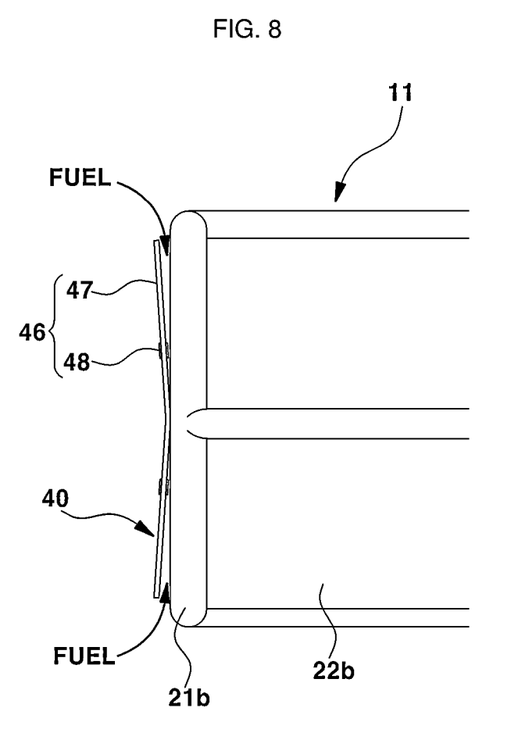
FIG. 8 is a view illustrating the operation of the opening unit of the mesh filter according to one form of the present disclosure.

FIGS. 7 and 8 are a perspective view and a side view, respectively, which illustrate the mesh filter according to one form of the present disclosure, in which FIG. 7 illustrates the state in which the opening unit is closed, and FIG. 8 illustrates the state in which the opening unit is open.

In the description, the boundary temperature (for example, 0° C.) between a temperature range in which solid paraffin wax component is created in fuel and a temperature range in which a solid paraffin wax component is not created in the fuel is referred to as a "critical temperature".

The opening unit 40 according to one form of the present disclosure may be a temperature-sensitive component adapted to open or close depending on the temperature of the fuel.

In the form illustrated in the drawings, the opening unit 40 is constructed so as to be operated by the application of power from a vehicle battery 45.

Although the first mesh member 22a is not illustrated in FIGS. 7 and 8, the first mesh member 22a is disposed in the internal space in the ring part 21b, which is positioned at the lower end of the mesh filter 11, as illustrated in FIGS. 3 to 6.

In the form, for realization of the temperature-sensitive construction, the opening unit 40 is constructed so as to receive power from the vehicle battery 45 via a temperature-sensitive switch 44, which is adapted to be turned on/off depending on the temperature of fuel.

The opening unit 40 may be connected to the temperature-sensitive switch 44 so as to receive power from the vehicle battery 45 via the temperature-sensitive switch 44. In the form, the temperature-sensitive switch 44, which is adapted to be turned on/off depending on the temperature of fuel, may be a conventional temperature-sensitive switch of the type that is currently used in a vehicles.

Specifically, the prefilter 12 (see FIG. 1) is provided with a temperature-sensitive switch adapted to allow the power from the battery to be selectively applied to a PTC heater or a heating coil depending on the temperature of the fuel. The temperature-sensitive switch 44 may be a temperature-sensitive switch of a type that is currently mounted on the prefilter.

The temperature-sensitive switch 44 is adapted to be turned on at a low temperature at which solid paraffin wax is created and to be turned off at a high temperature at which paraffin wax is dissolved.

Consequently, when the temperature-sensitive switch 44 is turned on in the state in which the temperature of fuel is low, the opening unit 40 receives the power from the battery via the temperature-sensitive switch 44. At this point, the opening unit 40 operates to open the fuel path in the first mesh member 22a using the power applied from the battery.

In contrast, when the temperature-sensitive switch 44 is turned off in the state in which temperature of the fuel is high, the opening unit 40 operates to close the fuel path, thereby preventing the fuel from passing through the first mesh member 22a.

The opening unit 40 of the mesh filter 11 may include a dielectric elastomer actuator (DEA), which operates so as to open and close the fuel path in the lower end of the mesh filter, that is, the fuel path in the first mesh member 22a, when the temperature-sensitive switch 44 is turned on/off.

In other words, the portion of the opening unit 40 that operates to open and close the fuel path serves as the dielectric elastomer actuator. The dielectric elastomer actuator is composed of a rubber film and complaint electrodes attached to both surfaces of the rubber film.

The dielectric elastomer actuator, which is well known in the art, operates in such a way that the rubber film is compressively deformed (contracted) due to Maxwell stress when power is applied to the compliant electrodes and the rubber film is restored to the initial shape when power is not applied to the compliant electrodes.

In the form, the opening unit 40 may include the dielectric elastomer actuator 46, which is composed of a rubber valve 47, made of a rubber film, and compliant electrodes 48 attached to both surface of the rubber valve 47. The dielectric elastomer actuator 46 itself is not different from a currently known actuator.

In the opening unit 40 according to the form, the rubber valve 47 is configured to have a circular plate shape, and is divided into two semicircular plates with respect to a central axis, which is an imaginary axis (folding line) extending through the center of the circular plate. The two semicircular plates are constructed so as to be rotatable with respect to the central axis 47.

Each of the two semicircular plates of the rubber valve 47 is provided on both surfaces thereof with the compliant electrodes 48 attached thereto, and the compliant electrodes 48 are connected to the temperature-sensitive switch 44 via a circuit.

Accordingly, when the temperature-sensitive switch 44 is turned on or off, the application of power to the compliant electrodes 48 from the battery 45 may be implemented or interrupted.

When the application of power to the compliant electrodes 48 from the battery 45 is implemented or interrupted, the compliant electrodes 48 deform or restore the rubber valve 47 so as to selectively open or close the fuel path in the first mesh member 22a.

Specifically, the opening unit 40 is constructed such that the rubber valve 47 is compressed (contracted) due to Maxwell stress so as to open the fuel inlet in the lower end of the mesh filter 11, that is, the fuel path in the first mesh member 22a, when the power from the battery 45 is applied to the compliant electrodes 48 and such that the rubber valve 47 is restored to the initial position so as to close the fuel path in the first mesh member 22a by virtue of release of the Maxwell stress when the application of the power to the compliant electrodes 48 from the battery 45 is interrupted or released.

In other words, when power is applied to the compliant electrodes 48, the compliant electrodes 48 contract and thus the portion of the rubber that is positioned between the compliant electrodes 48 correspondingly contracts due to Maxwell stress, thereby causing the rubber valve 47 to fold and open with respect to the central axis 47a, which is the folding line.

In the mesh filter 11 at a low temperature of fuel equal to or lower than the critical temperature (for example, 0° C.), at which solid paraffin wax is created, the temperature-sensitive switch 44 is turned on. As a result, power is applied to the compliant electrodes 48, and the rubber valve 47 is thus opened, thereby allowing the fuel in the fuel tank to be introduced into the filter through the first mesh member 22a.

When the rubber valve 47 is opened at a low temperature after starting up the engine, the fuel that has passed through the mesh filter 11 and the introduction pipe 23 (see FIGS. 5 and 6) is supplied to the engine through the fuel supply line. Subsequently, the portion of the fuel that is not consumed in the engine but is heated in the engine is recovered through a fuel recovery line. When the temperature of the fuel in the fuel tank is increased due to the recovery of the remaining fuel, the temperature-sensitive switch 44 is turned off, thereby allowing the rubber valve 47 to be closed again.

In other words, when the fuel in the fuel tank reaches a temperature higher than the critical temperature, the temperature-sensitive switch 44 is turned off, and thus the application of power to the compliant electrodes 48 is interrupted. As a result, the rubber valve 47 closes the fuel path in the first mesh member 22a, thereby allowing the fuel to pass only through the second mesh member 22b.

Figure 9:
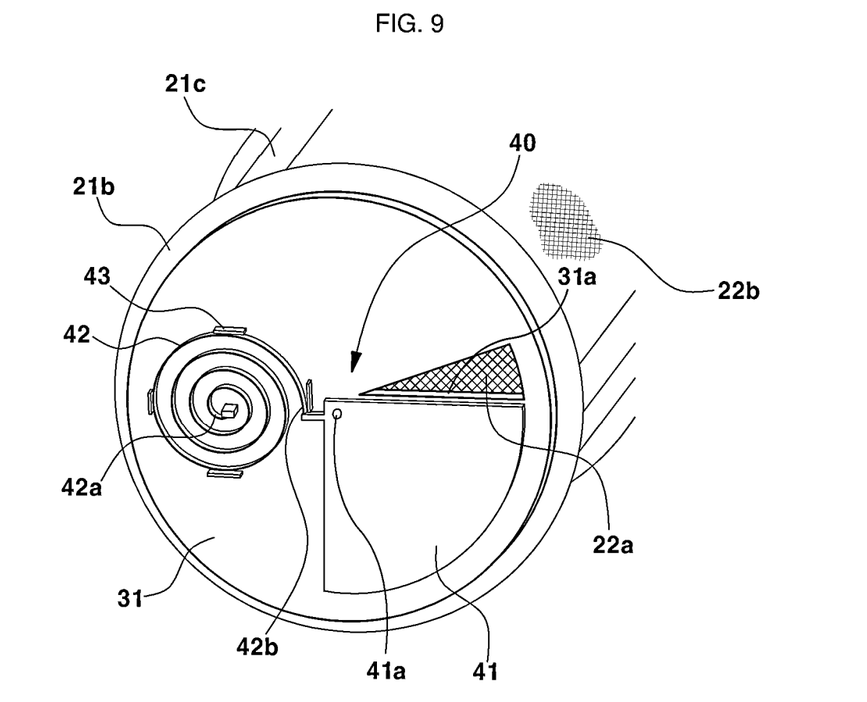
FIGS. 9 and 10 are views illustrating the structure and operation of an opening unit of a mesh filter according to another form of the present disclosure.
Figure 10:
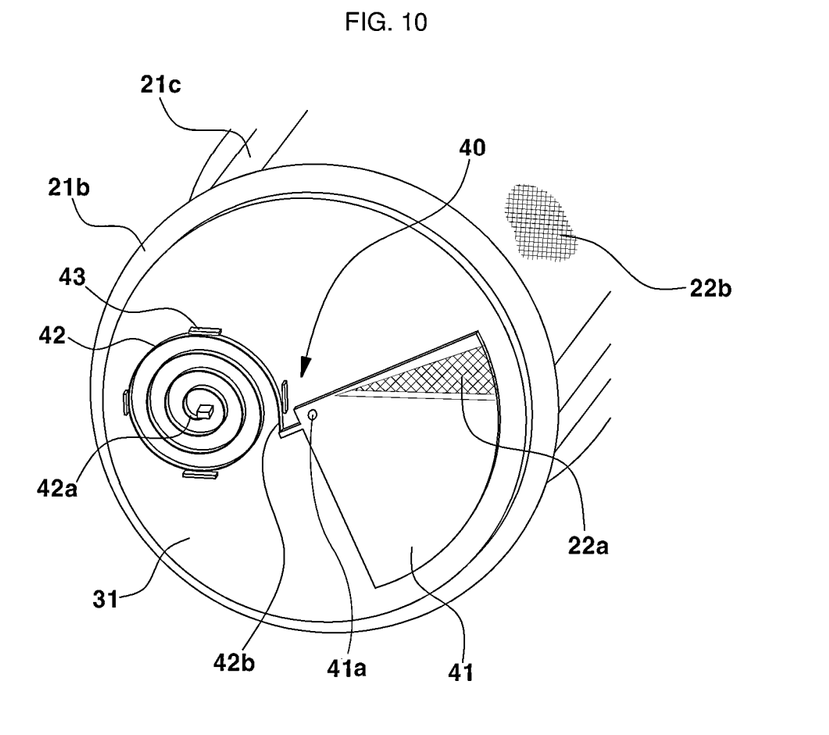

FIGS. 9 and 10 are views illustrating the construction and operation of an opening unit of a mesh filter according to another form of the present disclosure. FIG. 9 illustrates the state in which the fuel is allowed to be introduced into the filter through the first mesh member 22a by opening the opening unit 40, and FIG. 10 illustrates the state in which the opening unit 40 is closed.

As illustrated in the drawings, the ring part 21b may be provided with a closing member 31 coupled thereto so as to close a first region of the lower surface of the filter. The closing member 31 is provided in a portion thereof with an introduction hole 31a so as to allow fuel to pass therethrough.

The ring part 21b is positioned on the closing member 31. As in the form shown in FIG. 4, the first mesh member 22a and the support member 32 are disposed on the ring part 21b and coupled thereto.

The ring part 21b, the first mesh member 22a and the support member 32 are coupled in the manner described with reference to FIG. 4.

Referring to FIGS. 9 and 10, the mesh filter 11 is provided at the lower end thereof with the opening unit 40.

The opening unit 40 of the mesh filter shown in FIGS. 9 and 10 may also have a temperature-sensitive construction, which operates so as to open or close the fuel path depending on the temperature of the fuel.

In the temperature-sensitive construction, the opening unit 40 is constructed so as to open the fuel path in the first mesh member 22a in a temperature range equal to or lower than the critical temperature and to close the fuel path in the first mesh member 22a in a temperature range higher than the critical temperature.

In the form, the fuel path may be embodied as the inlet 31a formed in the closing member 31, and the opening unit 40 may be constructed so as to open or close the introduction hole 31a in the closing member 31 depending on the temperature of the fuel.

In other words, when the temperature of the fuel is in a range equal to or lower than the critical temperature (for example, 0° C.), the opening unit 40 opens the introduction hole 31a in the closing member 31, which is positioned in the fuel path in the first mesh member 22a, and the fuel, containing paraffin wax, in the fuel tank is thus introduced into the mesh filter 11 through the first mesh member 22a, as illustrated in FIG. 9.

Therefore, even when the second mesh member 22b is clogged by the paraffin wax, the fuel may be introduced into the filter through the first mesh member 22a and may then be supplied to the engine through the introduction pipe 23.

In contrast, when the temperature of the fuel is in a range higher than the critical temperature, the opening unit 40 closes the introduction hole 31a in the closing member 31, which is positioned in the fuel path in the first mesh member 22a, and the fuel is thus introduced into the filter only through the second mesh member 22b but not through the first mesh member 22a, as in a conventional mesh filter, as illustrated in FIG. 10.

Because foreign substances, which must be removed through the filter, may be present in the fuel even though paraffin wax component is not present in the fuel when the temperature of the fuel is in a range higher the critical temperature, the closing unit 40 closes the introduction hole 31a to prevent the foreign substances from passing through the first mesh member 22a, which has a large mesh size.

Consequently, the foreign substances may be removed from the fuel through the first mesh member while the fuel passes through the first mesh member 22a having a small mesh size as in a conventional mesh filter.

When a vehicle engine is started up at a low temperature, for example, in an extremely low-temperature state in which the temperature of external air is −18° C. and the velocity of air relative to a traveling vehicle is 100 km/hr, because a large amount of a paraffin wax component is present in the fuel at an initial stage, it is possible to prevent the fuel level in the filter from being lowered by causing the fuel containing the paraffin wax component therein to pass through the first mesh member 22a.

Over time, the temperature of the fuel in the fuel tank is increased due to the fuel that has been elevated in temperature in the engine and has been recovered to the fuel tank through the fuel recovery line 4 (see FIG. 1), whereby the entire paraffin wax component in the fuel completely melts.

Accordingly, it is sufficient to provide the flowability of the fuel by increasing the mesh size of the mesh filter only in winter season.

If fuel containing a large amount of a paraffin wax component is allowed to be introduced into the filter through the first mesh member 22a by opening the fuel path in the first mesh member 22a when the temperature of the fuel in the fuel tank is low, as in the present disclosure, it is possible to solve all the problems of decreased flowability of fuel, impossibility of fuel supply due to decreased flowability and the like.

In the form, the opening unit 40 may include the closing member 31 having the introduction hole 22a formed therethrough, an opening member 41, which is rotatably mounted on the closing member 31 and which opens or closes the introduction hole 31a in the closing member 31 depending on the rotational angle thereof, and a temperature-sensitive deformable member 42, which is mounted on the closing member 31 and is connected to the opening member 41 and which is deformable so as to rotate the opening member 41 depending on the temperature of the fuel contacting the temperature-sensitive deformable member 42.

The opening member 41 is coupled to the lower surface of the closing member 31 via a hinge pin 41a and is rotatable about the hinge pin 41a.

The temperature-sensitive deformable member 42 may be composed of a bimetal having a thin coil shape, and may be coupled to the lower surface (the outer surface) of the mesh filter 11, that is, the lower surface of the closing member 31.

The closing member 31 may be provided on the lower surface thereof with a guide 43, which is arranged along the spiral pathway of the deformable member 42. The guide 43 serves to prevent separation of the deformable member 42 while guiding the deformable member 42.

The first end 42a of the deformable member 42 is fixed to the lower surface of the closing member 31, and the second end 42b of the deformable member 42 is connected to the opening member 41.

When the second end 42b of the deformable member 42, which is connected to the opening member 41, is displaced due to deformation of the deformable member 42, the opening member 41 is pushed or pulled and is thus rotated about the hinge pin 41a by the second end 42b.

The deformable member 42 is mounted on the lower surface of the mesh filter 11, that is, the lower surface of the closing member 31, and the opening member 41 is rotatably mounted on the lower surface of the closing member 31 so as to open and close the introduction hole 31a formed in the closing member 31.

Because the opening member 41 is connected to the second end 42b of the deformable member 41, the rotational position and the state of the opening member 41 are determined according to the position of the second end 42b. The position of the second end 42b is changed according to the deformed state of the deformable member 42 and the temperature of fuel.

The operation of the mesh filter will now be described. As illustrated in FIG. 10, when the temperature of the fuel in the fuel tank is higher than the critical temperature (for example, 0° C.), the deformable member 42, which is in contact with the fuel in the fuel tank, expands due to the high temperature of the fuel.

At this time, because the length of the deformable member 42 is increased, the second end 42b of the deformable member 42 pushes the opening member 41.

As a result, the opening member 41 closes the introduction hole 31a in the closing member 31, with the result that the fuel can pass only through the second mesh member 22b but not through the first mesh member 22a.

Referring to FIG. 10, it is noted that the second end 42b of the deformable member 42 is maintained in the state in which the opening member 41 is closed because the deformable member 42, which is made of a bimetal expands.

Meanwhile, when the temperature of the fuel in the fuel tank is equal to or lower than the critical temperature, the deformable member 42, which is in contact with the fuel in the fuel in the fuel tank, contracts due to the low temperature of the fuel, as illustrated in FIG. 9.

At this time, because the length of the deformable member 42 is decreased, the second end 42b of the deformable member 42 pulls the opening member 41.

As a result, the opening member 41 is rotated so as to open the introduction hole 31a in the closing member 31, thereby allowing the fuel to pass through the first mesh member 22a.

Consequently, even when solid paraffin wax component is created in the fuel due to the low temperature of the fuel, the fuel containing the paraffin wax component can pass through the introduction hole 31a and the first mesh member 22a having a larger mesh size. Since the fuel is introduced into the filter, it is possible to prevent the problem of clogging of the filter.

As described above, the mesh filter for a fuel system of a vehicle according to the present disclosure is constructed such that the fuel path in the first mesh member having a larger mesh size is opened so as to allow the fuel containing the paraffin wax component to pass through the first mesh member when the fuel in the fuel tank is at a low temperature at which solid paraffin wax may form in the fuel. Consequently, the fuel is allowed to be supplied to the inside of the filter even under a low-temperature condition.

Therefore, it is possible to prevent the level of the fuel in the filter from being lowered below the inlet in the lower end of the introduction pipe, and thus it is possible to prevent interruption of fuel supply due to the generation of a large amount of air bubbles attributable to the introduction of air into the introduction pipe.

Furthermore, since the fuel path in the first mesh member is obstructed when the temperature of the fuel is increased, the foreign substances in the fuel cannot pass through the first mesh member having a larger mesh size, and the fuel can pass only through the second mesh member capable of removing the foreign substances. Accordingly, there is an advantage in that it is possible to prevent the problem of clogging of the filter by a paraffin wax component while preventing the introduction of foreign substances.

Consequently, the mesh filter according to the form of the present disclosure is able to solve the problems of introduction of air into the introduction pipe, generation of a large amount of air bubbles in the path for fuel supply, deterioration of fuel supply, deterioration of initial startup performance of an engine, shutdown of an engine during travelling, insufficient output of an engine, deterioration of acceleration performance of a vehicle and the like.

As described above, the mesh filter for a fuel system of a vehicle according to the present disclosure is able to solve conventional problems caused by clogging of the filter with paraffin wax.

Particularly, the mesh filter according to the present disclosure is able to solve problems of clogging of the filter with paraffin wax, the introduction of air into the introduction pipe and the generation of air bubbles in the path for fuel supply and various problems caused thereby while normally removing foreign substances contained in fuel.

The above description is illustrative of the present disclosure. Further, the above disclosure is intended to illustrate and explain the exemplary forms of the present disclosure, and the present disclosure may be used in various other combinations, modifications, and environments. In other words, the present disclosure may be changed or modified within the scope of the concept of the present disclosure disclosed herein, within the equivalent scope of the disclosure, and/or within the skill and knowledge of the art. The described forms illustrate the best state of the art to implement the technical idea of the present disclosure, and various changes may be made thereto as demanded for specific applications and uses of the present disclosure. Accordingly, the above description is not intended to limit the present disclosure to the forms.

What is claimed is:

1. A mesh filter for a fuel system of a vehicle, comprising:
a frame for maintaining a shape thereof;
a mesh member coupled to the frame and configured to remove foreign substances contained in fuel, wherein the mesh member includes: a first mesh member, and a second mesh member, where the second mesh member has a mesh size smaller than a mesh size of the first mesh member; and
an opening unit for opening and closing a fuel path in the first mesh member,
wherein the opening unit includes:
a temperature-sensitive switch, which is turned on/off depending on a temperature of the fuel; and
a dielectric elastomer actuator mounted on a lower end of the frame and configured to open the fuel path in the first mesh member upon application of power from a battery through the temperature-sensitive switch and to close the fuel path in the first mesh member upon interruption of application of the power from the battery.

2. The mesh filter of claim 1, wherein the first mesh member is positioned at a lower end of the mesh filter.

3. The mesh filter of claim 1, wherein the first mesh member is disposed at a bottom area of the mesh filter.

4. The mesh filter of claim 2, wherein an introduction pipe extends into an inside of the mesh filter through an upper end of the frame, and the fuel that has passed through the mesh member is introduced into the introduction pipe.

5. The mesh filter of claim 1, wherein the mesh size of the first mesh member is in a range of 200 μm to 400 μm.

6. The mesh filter of claim 5, wherein the first mesh member has a mesh size greater than 200 μm.

7. The mesh filter of claim 5, wherein the first mesh member has a mesh size of less than 400 μm.

8. The mesh filter of claim 1, wherein the dielectric elastomer actuator includes:
a plate-shaped rubber valve for selectively opening or closing the fuel path in the first mesh member by deformation thereof; and
compliant electrodes attached to both surfaces of the plate-shaped rubber valve, the compliant electrodes serving to selectively deform the plate-shaped rubber valve so as to open and close the fuel path in the first mesh member by application and interruption of the power from the battery via the temperature-sensitive switch.

* * * * *